United States Patent [19]

Turner et al.

[11] 4,277,087
[45] Jul. 7, 1981

[54] VEHICLE REAR LEAF SPRING SUPPORT

[75] Inventors: Nelson R. Turner, Battle Creek; Daniel E. Sanders, Lansing; Charles A. Bienenstein, Bloomfield, all of Mich.

[73] Assignee: The Model A and Model T Motor Car Reproduction Corporation, Battle Creek, Mich.

[21] Appl. No.: 79,998

[22] Filed: Sep. 28, 1979

[51] Int. Cl.$^3$ ............................................. B60G 11/04
[52] U.S. Cl. ................................. 280/718; 267/54 R; 280/137
[58] Field of Search ................. 280/718, 694, 699, 137; 403/56; 267/54, 55, 56; 105/364, 422; 295/42

[56] References Cited

U.S. PATENT DOCUMENTS

| 1,470,391 | 10/1923 | Sanford | 105/422 |
|---|---|---|---|
| 1,479,322 | 1/1924 | Sanford | 105/422 X |
| 2,554,553 | 5/1951 | Benz | 267/54 R |
| 2,562,256 | 7/1951 | Benz | 267/54 R |
| 2,853,325 | 9/1958 | Ward | 267/54 A X |
| 3,013,808 | 12/1961 | Willetts | 267/57 X |
| 3,039,831 | 6/1962 | Thomas | 267/54 R X |
| 3,117,772 | 1/1964 | Brown | 267/54 R |
| 3,230,000 | 1/1966 | Simpson | 267/54 A X |
| 3,510,149 | 5/1970 | Raidel | 267/54 X |
| 3,844,579 | 10/1974 | Cunha | 280/718 |
| 4,093,272 | 6/1978 | Raidel | 280/718 X |
| 4,098,523 | 7/1978 | Valerio | 280/718 |

Primary Examiner—John P. Silverstrim
Assistant Examiner—Norman L. Stack, Jr.
Attorney, Agent, or Firm—Settle and Walker

[57] ABSTRACT

A rear leaf spring support for vehicles having a frame which includes a pair of spaced apart side members tapering inward from a rear portion of the vehicle to a front portion of the vehicle is disclosed. A pair of shackle supports, one for each spring, are affixed the frame at the frame rear portion. A pair of front spring supports, one for each spring are affixed a lower flange of the frame vertically above a forward end of the spring. Each front spring support comprises an upper wall affixed a lower flange of the frame side member, an inner edge aligned with an inner edge of the shackle support integral with the upper wall, an outer edge spaced outward from the frame aligned with an outer edge of the shackle support integral with the upper wall, the inner and outer walls extending downward a distance parallel to a longitudinal axis of the vehicle. A forward end of the spring is positioned between the inner and outer walls and pivotally attached thereto. A pair of opposed shackle links interconnect a rear end of the spring to the shackle supports.

1 Claim, 4 Drawing Figures

VEHICLE REAR LEAF SPRING SUPPORT

BACKGROUND OF THE INVENTION

I. Field of the Invention

The present invention generally relates to the field of vehicle suspension systems and, in particularly, the present invention is concerned with supports for vehicle rear suspension systems. Even more particularly the present invention relates to the field of vehicle rear suspension system supports employing longitudinally oriented leaf springs supported by a vehicle frame having side members tapering from a rear portion of the vehicle to a front portion thereof.

II. Description of the Prior Art

Numerous examples of supports for longitudinally oriented leaf springs in the suspension systems of vehicles are available in prior United States patents. Examples of such leaf springs supports are disclosed in U.S. Pat. Nos. 1,679,414; 1,743,389; and 1,955,968. These United States Patents are relevant in that they disclose a variety of supports for longitudinally oriented leaf springs in vehicle suspension systems. None of the above listed United States patents disclose the shackle construction employed in the present invention, nor do they disclose a leaf spring support for a vehicle frame tapering from a rear portion of the vehicle inward toward a front portion of the vehicle.

III. Prior Art Statement

The aforementioned prior art in the opinion of the Applicant and his Attorney represents the closest prior art of which the Applicant and his Attorney are aware.

SUMMARY OF THE INVENTION

The present invention which will be described in greater detail subsequently, comprises a rear suspension system support for a motor vehicle which employs a pair of longitudinally oriented spaced apart leaf springs positioned at a rear portion of the vehicle, the vehicle having a frame including a pair of spaced apart side members which taper inward from the rear portion of the vehicle to a front portion thereof. The support includes a pair of shackle supports, one for each spring, affixed the side members of the frame at the rear portion and comprising a rearward extending horizontal planar piece which extends rearward a distance past the frame rear portion, the piece then curving downward then forward and upward in an arcuate manner to form an upper transverse aperture.

The present invention further includes a front spring support which comprises an upper wall affixed to a lower flange of the frame, a downward extending inner wall integral with the upper wall and longitudinally aligned with an inner edge of the shackle support, and a downward extending outer wall integral with the upper wall spaced transversely outward from the frame a distance aligned with an outer edge of the shackle support. A pair of transversely aligned first and second spring support apertures are formed in the inner and outer walls respectively to support a forward end of the leaf spring in a manner which will be described subsequently.

A forward end of the leaf spring curves downward then rearward then upward in an arcuate manner to form a spring forward aperture. A first pair of opposed headed bushings snugly engage the spring forward aperture, and a first sleeve aperture formed therein is aligned with the first and second spring support apertures. A bolt passing through the aligned apertures with a nut threadingly engaging a threaded end thereof affixes the front end of the spring to the front spring support.

A rear portion of the leaf spring curves upward then inward then downward in an arcuate manner to form a spring rear aperture. A pair of opposed headed bushings snugly engage the upper transverse aperture and another pair of opposed headed bushings snugly engage the spring rear aperture. A pair of opposed shackle links engage the bushings to connect the rear end of the spring to the shackle support.

It is therefore a primary object of the present invention to provide an improved support for a vehicle rear end suspension system which employs a pair of opposed longitudinally oriented leaf springs.

It is a further object of the present invention to provide such a support for a vehicle rear end suspension system that mounts the longitudinally oriented springs to a vehicle frame that tapers inward from a rear end thereof toward the front end of the vehicle.

It is a further object of the present invention to provide an improved shackle link to connect a rear end of the spring to the vehicle frame which employs a minimum number of parts.

For a more complete understanding of the present invention, reference is made to the following detailed description and accompanying drawings.

Other objects, advantages, and applications of the present invention will become apparent to those skilled in the field to which this invention pertains, when the accompanying description of the best modes contemplated for practicing the invention are read in conjunction with the accompanying drawings.

BRIEF DESCRIPTION OF THE DRAWINGS

In the drawings, like reference numbers refer to like parts throughout the several views, and wherein.

DESCRIPTION OF THE PREFERRED EMBODIMENT

Figure 1:
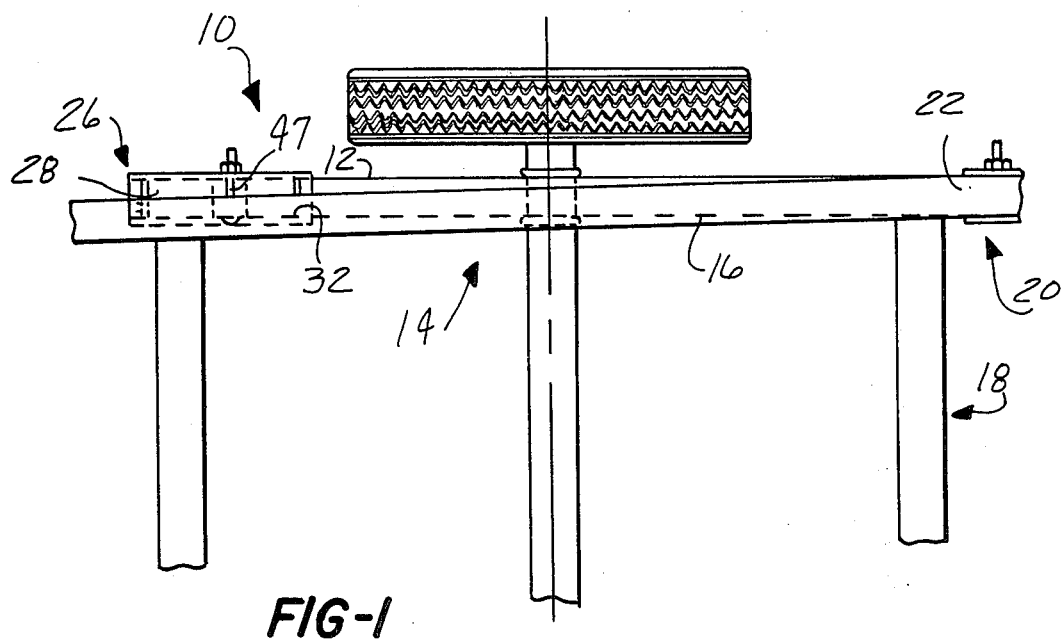
FIG. 1 illustrates a top view of the frame and spring support of the present invention.

Referring now to the drawings, and in particular to FIG. 1 wherein there is illustrated at 10 one example of the spring support of the present invention. The spring support system 10 is adapted to mount a longitudinally oriented leaf spring 12 to a frame 14. The frame includes side members 16 which taper inward from a rear portion of the frame 18 toward a front portion thereof.

The spring support system 10 includes a pair of shackle supports 20, one for each spring, affixed a rear portion of the side members 16. The shackle support 20 comprises a rearward extending horizontal planar piece 22 extending rearward a distance past the frame rear portion 18 a distance then curving downward then forward and then upward in an arcuate manner forming an upper transverse aperture 24.

Figure 2:
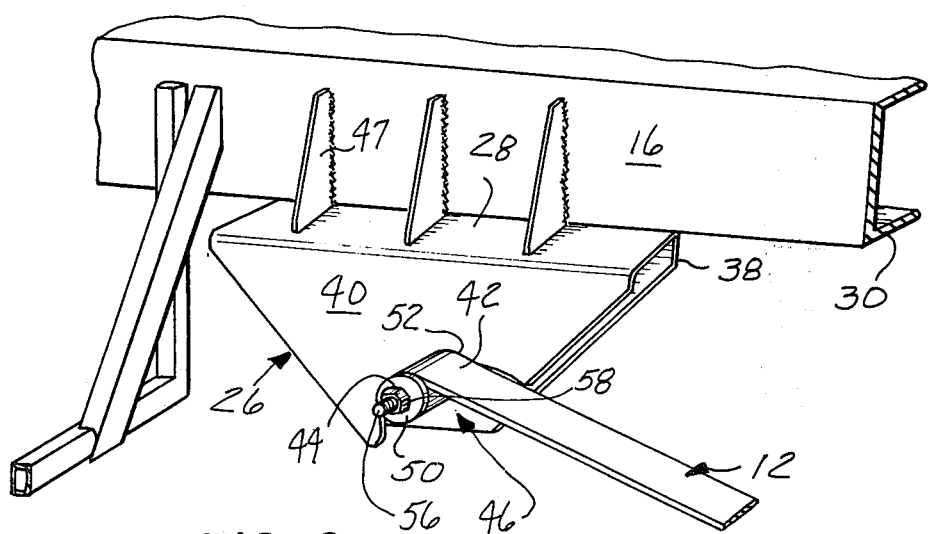
FIG. 2 illustrates a broken perspective view of the front spring support and frame of the present invention.
Figure 3:
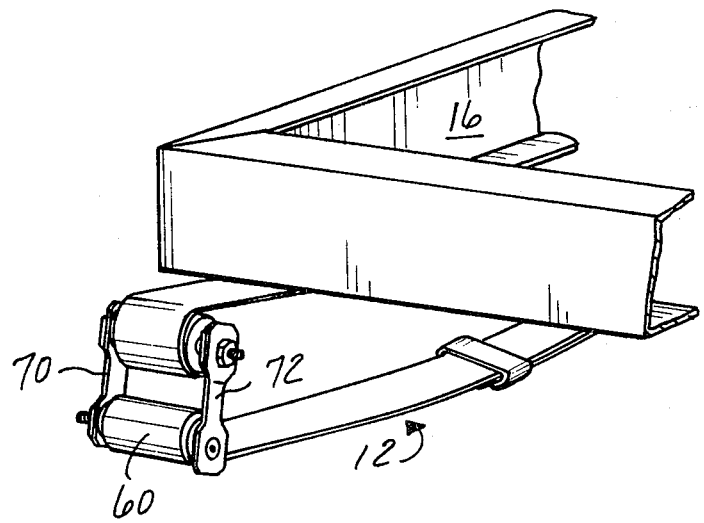
FIG. 3 illustrates a broken perspective view of the shackle support and shackle of the present invention.
Figure 4:
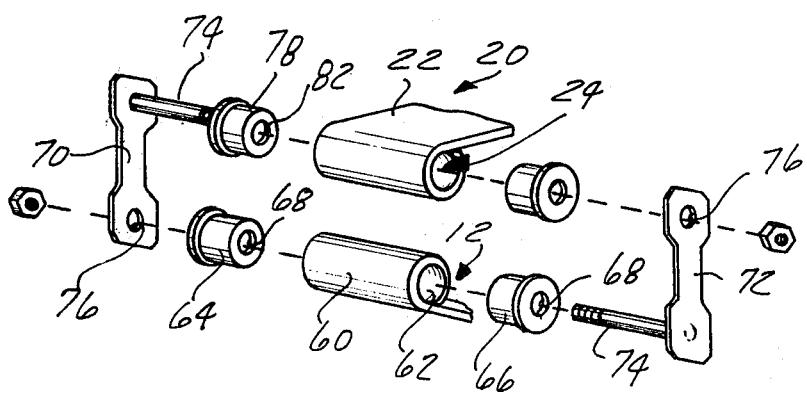
FIG. 4 illustrates a broken exploded perspective view of the spring shackle of the present invention.

The spring support system 10 further comprises a front spring support 26 (FIG. 2) which includes an upper wall 28 affixed a lower flange 30. An upper wall inner edge 32 is aligned with an inner edge of the shackle support 20. An outer edge of the upper wall is spaced outward from the frame side member 16 to align the spring 12 with the vehicle axis. The front spring support further includes an inner wall 38 integral with the upper wall 32 longitudinally aligned with an inner edge of the shackle support extending downward a distance. A downward extending outer wall 40 integral with the upper wall 28 is formed parallel with the inner wall 38. An inner edge of the outer wall is aligned with an outer edge of the shackle support. Transversely aligned first spring support and second spring support apertures 42,44 are formed in the inner wall 38 and outer wall 40 respectively, and means 46 are provided for attaching a forward end of the leaf spring 12 to the front spring support 26 using the first and second spring support apertures 42,44 in a manner which will be described subsequently. A plurality of gussets 47 are attached along one edge to the upper wall 24 and along another edge attached to the side member 16. The gussets aid in attaching the front support 26 to the side member 16 improving the strength of the assembly.

The means 46 for attaching the forward end of the leaf spring 12 to the front spring support 26 comprises a forward end of an upper leaf of the spring 12 curving downward then rearward then upward in an arcuate manner to form a spring forward aperture 48; a first pair of opposed headed bushings 50,52 snugly engaging the spring forward aperture 48; and a sleeve aperture 54 formed in each headed bushing aligned with the first and second spring support apertures 42,44. A bolt 56 slidingly engages the sleeve apertures 54 and the aligned support apertures 42,44 with a nut 58 threadingly engaging a threaded end of a bolt 56 to secure the forward end of the spring 12 to the front spring support 26.

The means 25 for attaching a rear end of the leaf spring 12 to the shackle support 20 comprises: a rear end of an upper leaf of the spring proximate the shackle support 20 curving downward then forward and upward in an arcuate manner to form a spring rear aperture 62; a second pair of opposed headed bushings 64,66 snugly engaging the spring rear aperture 62, with a second sleeve aperture formed in the bushings 64,66 concentric with the spring rear aperture 62. The means 25 further includes a pair of opposed shackle links 70,72 disposed outward of the bushings 64,66 with each shackle link including a transversely extending rod 74 at one end and a shackle aperture 76 through the link at another end. One rod 74 is aligned with the spring rear aperture 62 and the other rod 74 is aligned with the upper transverse aperture 24. A third pair of opposed headed bushings 78,80 snugly engage the upper transverse aperture 24, and a third sleeve aperture 82 is formed in the bushings 78,80 concentric with the upper transverse apertures. Each rod 74 slidingly engages its corresponding sleeve apertures, and a threaded end of the rod 74 threadingly engages a nut 84 to secure the spring rear end 60 to the shackle support.

It can thus be seen that the present invention has provided a new and improved system for attaching a pair of longitudinally oriented spaced apart leaf springs to the frame of a vehicle with the frame including a pair of opposed side members which taper inward from a rear portion of the frame to a forward portion thereof.

It should be understood by those skilled in the art of suspension systems that other forms of the Applicant's invention may be had, all coming within the spirit of the invention and the scope of the appended claims.

Having thus described my invention what I claim is:

1. In an automotive vehicle having a pair of side frame elements which converge forwardly and a transverse rear axle underlying the frame elements adjacent the rear ends thereof, a suspension for the rear axle comprising an open-bottomed mounting box suspended beneath each of the frame elements forwardly of the axle and having spaced vertical side walls, each mounting box being angularly related to the overlying frame element so that each of the box sidewalls is perpendicular to the axis of the axle, a transverse mounting bolt projecting across each said box below the frame elements and parallel to the axis of the axle, a pair of parallel, longitudinally extending leaf springs supporting the rear axle, each leaf spring having its forward end lying between the side walls of the associated mounting box and secured to the adjacent mounting bolt, and means securing the rear end of each of said springs to the adjacent frame element in longitudinal alignment with the front end of the respective spring, so that the springs are retained in parallel relation and are guided for movement in a plane which is truly perpendicular to the axis of said axle regardless of the convergence of the side frame elements.

* * * * *